United States Patent [19]

Wakai

[11] 4,456,960
[45] Jun. 26, 1984

[54] METHOD AND DEVICE FOR DETECTING TOOL ABNORMALITY IN MACHINE TOOLS

[75] Inventor: Hideyuki Wakai, Hirakata, Japan

[73] Assignee: Kabushiki Kaisha Komatsu Seisakusho, Tokyo, Japan

[21] Appl. No.: 247,233

[22] Filed: Mar. 25, 1981

[30] Foreign Application Priority Data

| Mar. 27, 1980 [JP] | Japan | 55-39496 |
| Mar. 27, 1980 [JP] | Japan | 55-39497 |
| Mar. 27, 1980 [JP] | Japan | 55-39498 |
| Mar. 27, 1980 [JP] | Japan | 55-39499 |

[51] Int. Cl.³ .................... G06F 15/46; G05B 23/02
[52] U.S. Cl. .................. 364/474; 318/565; 364/184; 364/507; 364/511
[58] Field of Search ............ 364/474, 475, 507, 508, 364/550, 551, 167, 170, 171, 511, 184; 318/561, 565, 572; 408/8, 9, 11; 73/104

[56] References Cited

U.S. PATENT DOCUMENTS

| 4,031,368 | 6/1977 | Colding et al. | 364/475 |
| 4,078,195 | 3/1978 | Mathias et al. | 364/474 X |
| 4,176,396 | 11/1979 | Howatt | 364/474 X |
| 4,220,995 | 9/1980 | Shoda | 364/474 X |
| 4,279,013 | 7/1981 | Cameron et al. | 364/474 X |
| 4,326,257 | 4/1982 | Sata et al. | 364/474 X |
| 4,351,029 | 9/1982 | Maxey et al. | 364/474 X |

Primary Examiner—Jospeh F. Ruggiero
Attorney, Agent, or Firm—Spensley, Horn, Jubas & Lubitz

[57] ABSTRACT

Method and device for detecting tool abnormality in machine tools in which a threshold value is determined based on the condition of a tool in machining and tool abnormality is detected by comparing data successively obtained from the tool during machining with the threshold value. The threshold value is determined by computing the tool condition data in machining for a period when an externally provided switch is on and stored in a memory of the device when the switch turns off.

The application of this invention to numerical controlled machine tools is also disclosed in which a plurality of threshold values are determined according to machining conditions in each machining process and tool abnormality is detected by comparing tool condition data during machining with one of the threshold values corresponding to the condition of the machining.

19 Claims, 18 Drawing Figures (BASIC BLOCK)

METHOD AND DEVICE FOR DETECTING TOOL ABNORMALITY IN MACHINE TOOLS

BACKGROUND OF THE INVENTION

This invention relates to tool abnormality detecting methods and devices for detecting tool abnormalities in machine tools and more particularly to tool abnormality detecting methods and devices for detecting tool abnormalities by comparing input data which vary according to the tool conditions with a specified threshold value.

A method for detecting abnormalities of tools, such as cutting tools, has already been conceived in which input data varying according to tool conditions, such as a spindle current (the armature current of a field constant DC spindle motor for rotating the work), a feed current (the armature current of a field constant DC motor for feeding the tool), and vibration of the tool, are constantly monitored and abnormalities are found by comparing the above data with a preset threshold value.

However, the above method has an essential drawback that if the preset threshold value is not properly chosen, the tool is often judged normal when it is actually abnormal, and vice versa.

Many efforts have been made to solve this problem and various methods have been proposed as a result.

However, since the threshold value is affected by a variety of conditions, determining a proper threshold value prior to machining has been very difficult.

In addition, since a numerically-controlled machine tool (hereinafter referred to as an NC machine tool) generally performs versatile machinings, it is not sufficient to set only one threshold value. That is, since the threshold value is normally different from machining to machining, many threshold values should be set corresponding to individual machinings. Setting numbers of threshold values is extremely complex.

A particular problem here is that if the set threshold value is not properly chosen, the tool is judged normal when it is actually abnormal, and vice versa. However, it is in practice very difficult to determine all threshold values before machining, due to factors, such as the material of the object to be machined, involved.

Furthermore, the selection of one of many threshold values is performed based on a numerical control data (hereinafter referred to as an NC data), and if all different identification codes for discriminating and selecting many threshold values are to be inserted in the NC data, numbers of identification codes should be provided. In addition, since the number of usable identification codes when such arrangement is made is limited, changing the structure (organization) of the NC data to a great extent has become necessary.

SUMMARY OF THE INVENTION

The primary object of the invention is to provide tool abnormality detecting methods and devices which enable a proper tool abnormality detection through the setting of proper threshold values by simple operations, taking into account the above-mentioned problems.

According to the invention, there is provided an external threshold value setting switch, input data which vary according to the tool condition are sequentially stored as the above switch is turned on, a threshold value is determined based on said stored input data as the switch is turned off, and said threshold value is automatically set.

Further, according to the invention, there is provided an external threshold value setting switch, input data outputted from the NC machine tool which vary according to the tool condition are sequentially stored as said switch is turned on, a threshold value is determined by a method determined in advance based on the input data stored in said memory (for example, a method in which the maximum or average value of stored input data is increased according to the specified ratio), and said threshold value is automatically set.

Further, according to the invention, judgement is made whether or not the sequence is one for performing the abnormality detection through the insertion of a discrimination data, e.g., M data, for discriminating whether or not the abnormality detection is made in the NC data, e.g., an NC tape, and at the same time a threshold value corresponding to the sequence is selected based on the specified data, e.g., N data, in the sequence.

Further, according to the invention, input data varying according to the tool conditions and a threshold value to be compared therewith are displayed in a display unit, a means to change said threshold value externally, such as an external switch or an external variable resistor, is provided, the threshold value in the display unit is rewritten as the threshold value is changed by said external threshold value change means, and the threshold value may be changed while visually observing the relationship between the input data and the threshold value.

A more detailed description of the invention will now be given with reference to the attached drawing.

DESCRIPTION OF PREFERRED EMBODIMENT

Figure 1:
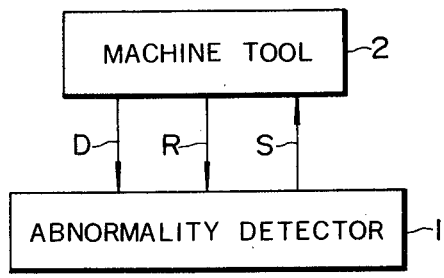
FIG. 1 is a block diagram of an example of a tool abnormality detector.
Figure 2:
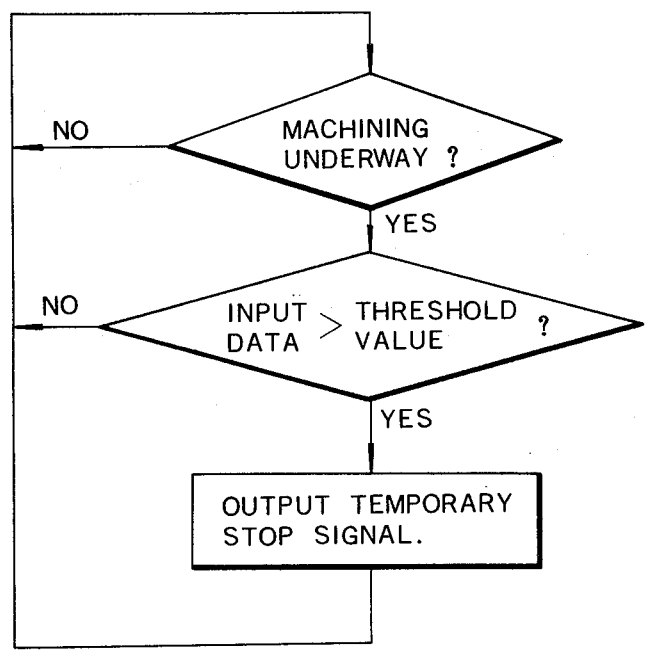
FIG. 2 is a flowchart showing the steps in the tool abnormality detection in FIG. 1.

Before entering the description of the tool abnormality detector according to the invention, an example of the tool abnormality detector which detects tool abnormalities through the comparison between the input data varying according to the tool conditions and the specified threshold value with reference to a block diagram shown in FIG. 1 and a flowchart shown in FIG. 2. In FIG. 1, a tool abnormality detector 1 receives input data D, such as a spindle current or a feed current and a machining (in-process) data R for discriminating whether or not machining is underway, from a machine tool 2. As shown in FIG. 2, said detector 1 first judges whether or not machining is underway based on said machining data R, comparison is made between the input data D and a threshold value T which has been set in advance through a variable resistor or other means when machining is being performed, a temporary stop signal S is generated upon the establishment of the D>T condition, and said signal S is sent out to the machine tool 2 causing the machine tool to stop temporarily. When machining is not being performed and the D>T condition is not established, the above discriminating operation is repeated without generating a temporary stop signal S. Such abnormality detector may easily be constructed using a microcomputer for example.

Figure 3:
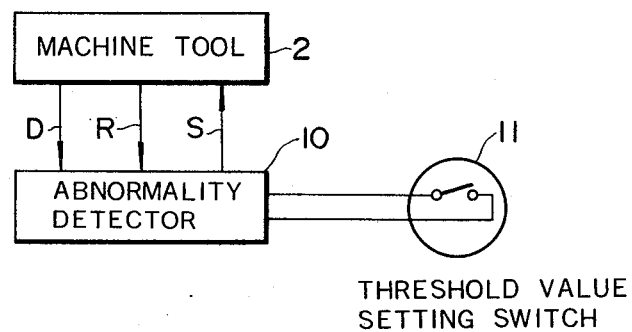
FIG. 3 is a block diagram of a tool abnormality detector according to an embodiment of the invention.

Referring to FIG. 3, an abnormality detector 10 receives an input data D varying according to the conditions of a tool (not shown) and a machining (in-process) data R for indicating whether or not machining is underway from a machine tool 2, similar to the device shown in FIG. 1. To the abnormality detector 10 is connected a threshold value setting switch 11.

Figure 4:
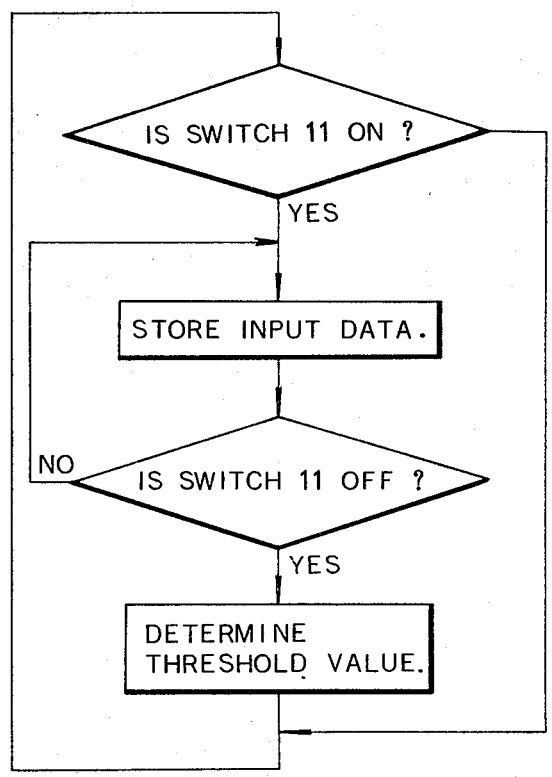
FIGS. 4 through 7 are flowcharts showing the steps in the abnormality detection according to the embodiment.
Figure 5:
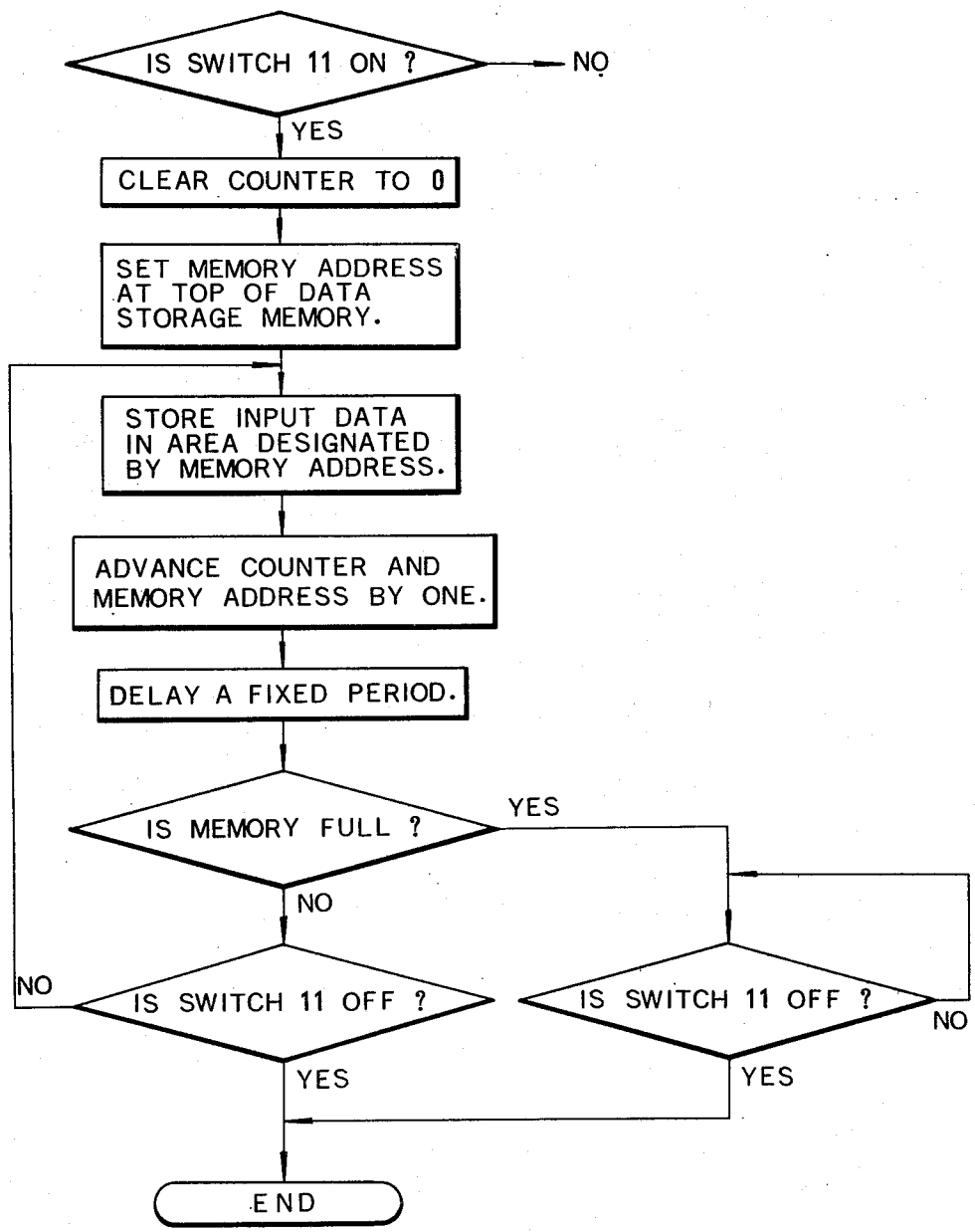
Figure 6:
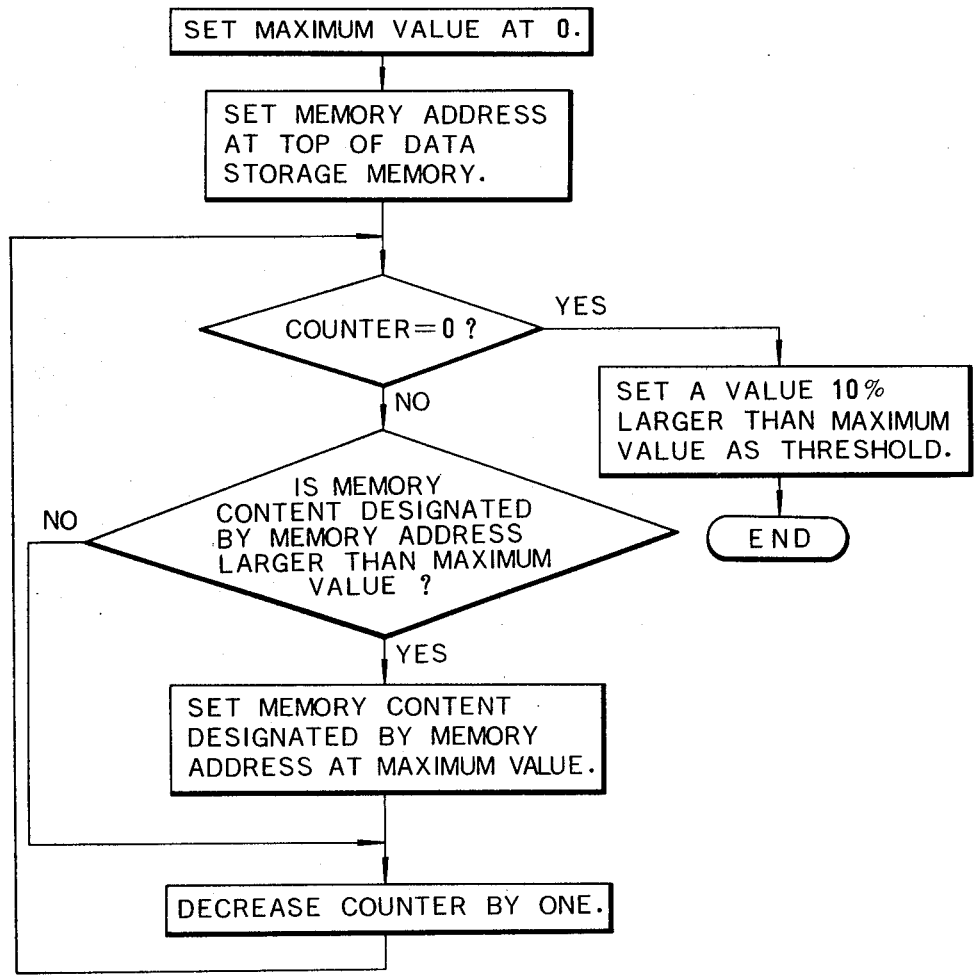

As shown in the flowchart of FIG. 4, the threshold value setting by the abnormality detector 10 is started by the discrimination whether the threshold value setting switch 11 is ON or OFF. If the switch 11 is ON, input data outputted from the machine tool 2 are sequentially stored at specified sampling intervals in a memory (not shown) until the switch 11 becomes OFF. When the switch 11 is judged OFF, a threshold value is determined based on the input data stored in said memory, and said threshold value is set. FIGS. 5 and 6 show the procedure of storing the input data when the switch 11 becomes ON and the procedure of determining the threshold value when the switch 11 becomes OFF in more detail by way of flowcharts. The procedure is controlled according to the content of a control counter (not shown). As shown in FIG. 5, when the switch 11 is judged ON, the content of the counter is cleared to "0", and a memory address is set at the head of a data storage memory (not shown) corresponding to said memory, and an input data outputted from the machine toll 2 is stored in the memory area indicated by the memory address. Then, the content of the counter and the memory address are advanced by one, and the input data is stored in the memory area indicated by the memory address after a fixed time providing that the memory is not overflown nor is the switch 11 OFF. Subsequently, the same operation is repeated until the switch 11 becomes OFF. As the switch 11 becomes OFF, the above operation stops.

As shown in FIG. 6, the threshold value setting procedure starts with the setting of the maximum value at "0" and loading it at a specified memory area, and the memory address is set at the head of the data memory address. Then, discrimination is made to find whether or not the content of the counter is "0". The content of the counter here is not "0" since it corresponds to the number of samples stored in the data storage memory when the switch 11 is ON. Then, a comparison is made between the content DM of the memory specified by the memory address and the maximum value M stored in the specified area, and judgement is made whether or not the condition DM>M is established. When the condition DM>M is established, the maximum value is rewritten according to the content of the memory specified by the memory address, the content of the counter is decreased by one, and again judgement is made whether or not the content of the counter is "0". When the condition DM>M is not established, the content of the counter is decreased by one without changing the maximum value, and judgement is made if the content of the counter is "0" or not.

When the content of the counter becomes "0" after the repetition of the above operation, the content of the maximum value becomes the maximum value of the input data stored in the data storage memory when the switch 11 is ON. Now, a value, e.g., 10%, larger than said maximum value is set as the threshold value.

As described above, input data are sequentially stored in the memory as the threshold value setting switch 11 is turned on, a threshold value is determined based on the input data stored in said memory as the threshold value setting switch 11 is turned off, and said threshold value is set automatically.

Though in the above embodiment a value 10% larger than the maximum value is set as the threshold value, a value 20% or even 30% larger than the maximum value should be set as the threshold value for some objects to be machined.

While in the above embodiment the threshold value is determined based on the maximum value of the input data stored in the memory, the threshold value may be determined based on the average value of the input data stored in the memory.

Figure 7:
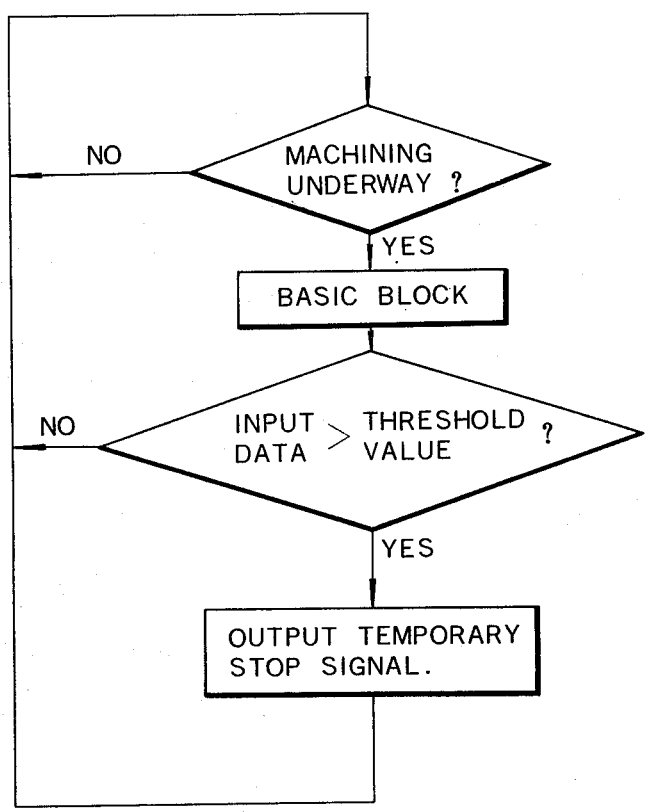

As shown in FIG. 7 the basic block flow for determining and setting a threshold value is inserted between the judgement of whether or not machining is underway and the judgement of whether or not the condition input data>threshold value is established shown in FIG. 2. That is, first judgement is made whether or not machining is being performed, the procedure step proceeds to the basic block flow shown in FIG. 4 when machining is underway, then judgement is made whether or not the input data is larger than the set threshold value, if the condition input data>threshold value is established, a temporary stop signal S is sent out to the machine tool 2.

Figure 8:
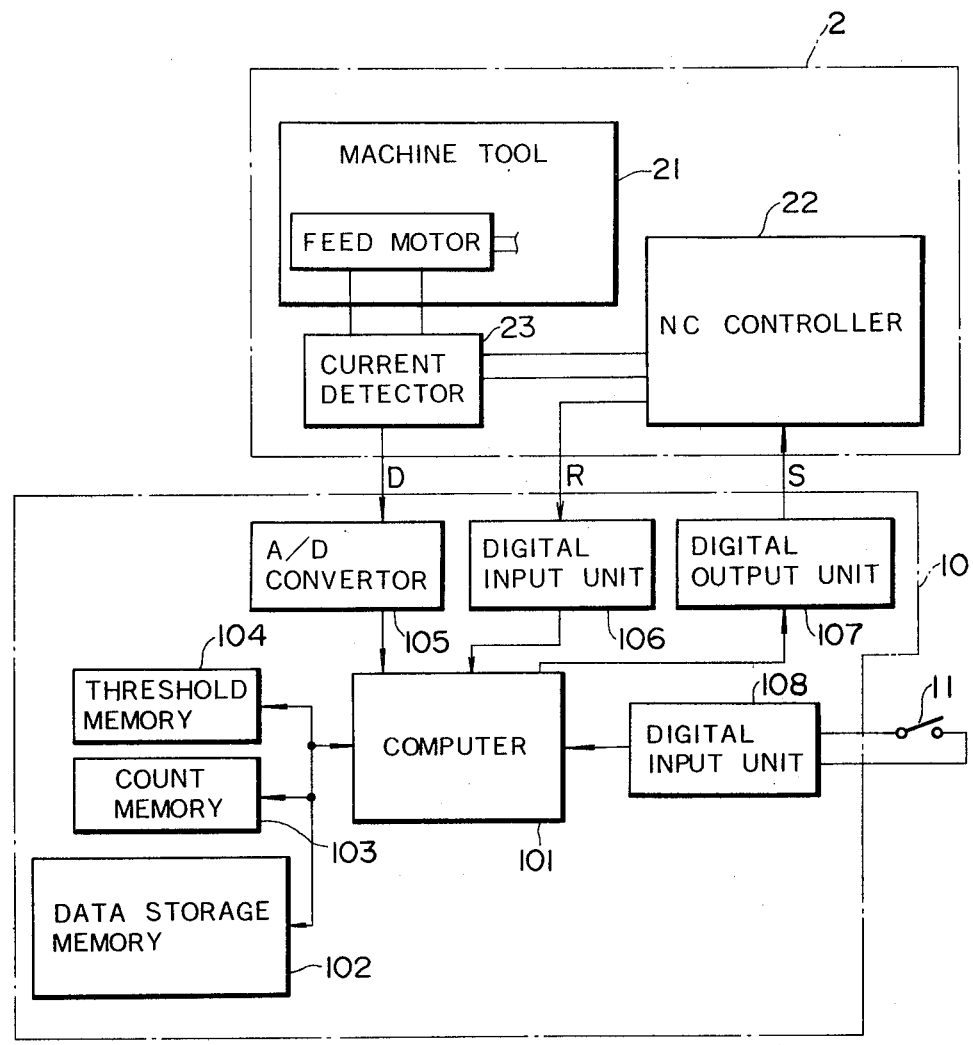
FIG. 8 is a detailed block diagram of the embodiment.

Referring to FIG. 8, the machine tool 2 comprises a machine tool section 21, a numerical control controller 22, and a current detector 23 for detecting the feed current of a feed motor 211 of the machine tool 21. The current detector 23 and the numerical control controller 22 output a signal indicating the detected current value (input data D) and a machining data R indicating whether or not machining is being performed respectively, and feed these data to an abnormality detector 10.

The abnormality detector 10 comprises a computer 101, a data storage memory 102, a count memory 103, a threshold value storage memory 104, an analog-to-digital converter 105 for converting input data D fed from the current detector 23 into digital data and applying the resultant data to the computer 102, a digital input device 106 for applying the machining data R fed from the numerical control controller 22 to the computer 101, a digital output device for applying a temporary stop signal S generated from the computer 101 to the numerical control controller 22, and a digital input device 108 for applying the output of the threshold value setting switch 11 to the computer 101.

In such system configuration, as the threshold value setting switch 11 is turned on, the computer 101 sequentially receives input data D through the analog-digital converter 105 and loads this data into the data storage memory 102, and at the same time sequentially increases the content of the count memory 103. This operation is continued until the threshold value setting switch 11 becomes OFF.

As the threshold value setting switch 11 becomes OFF, a threshold value is determined and controlled. That is, the computer 101 sets the value of the threshold value storage memory 104 at "0", specifies an address at the head of the data storage memory 102, and compares the data stored at said address with the content of the threshold value storage memory 104. If the content of the data storage memory 102 is greater than the content of the threshold value storage memory 104, the content of the threshold value storage memory 104 is rewritten so as to correspond with the content of the data storage memory 102. Inversely, when the content of the threshold value storage memory 104 is greater than the data storage memory 102, the content of the threshold value storage memory 104 is held without being rewritten. Subsequently, the data memory address is advanced by "1" and the content of the count memory 103 is decreased by "1", and the comparison control similar to the above is performed. This operation is repeated until the content of the count memory 103 becomes "0". Through the above operation the maximum value of all data loaded into the data storage memory 102 is loaded into the threshold value storage memory 104. The computer 101 sets a threshold value based on the data loaded into the threshold storage memory 104. That is, the computer 101 rewrites the value loaded into the threshold value storage memory to a value 10% (for example) larger.

During the machining process (R="1") the computer 101 compares the threshold value stored in the threshold value storage memory 104 with the input data fed from the current detector 23, and if the condition threshold value input data D is established, the computer 101 sends out a temporary stop signal S to the numerical control controller 22 through the digital output device 107.

The above description has been made relative to the case where the input data D increases as an abnormality occurs. The above operation is reversed when the input data D decreases upon occurrence of an abnormality. That is, a value 10% smaller than the minimum value of all data stored in the data storage memory 102 is stored in the threshold value storage memory 104, and when the condition threshold value input data D is established, a temporary stop signal S is generated.

Figure 9:
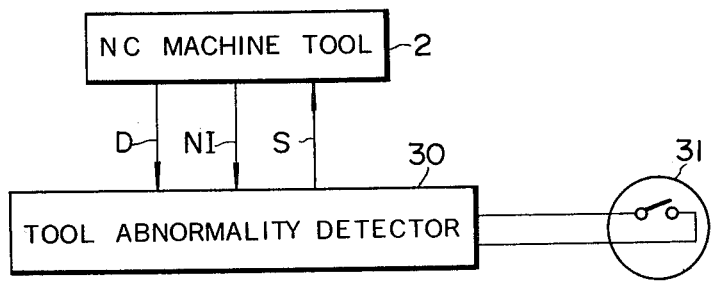
FIG. 9 is a block diagram of a tool abnormality detector according to another embodiment of invention.

Referring to FIG. 9, the tool abnormality detector 30 receives input data D such as spindle currents and feed currents which vary according to the tool conditions and NC data NI for identifying the machining location and selecting a threshold value from the NC machine tool 2, and sends out a temporary stop signal S to the NC machine tool upon detection of a tool abnormality.

While the tool abnormality detector 30 performs a normal abnormality detecting operation when the external threshold value setting switch 31 is OFF, the tool abnormality detector does not perform the abnormality detecting opertion but performs the threshold value setting when the switch 31 is turned ON.

Figure 10:
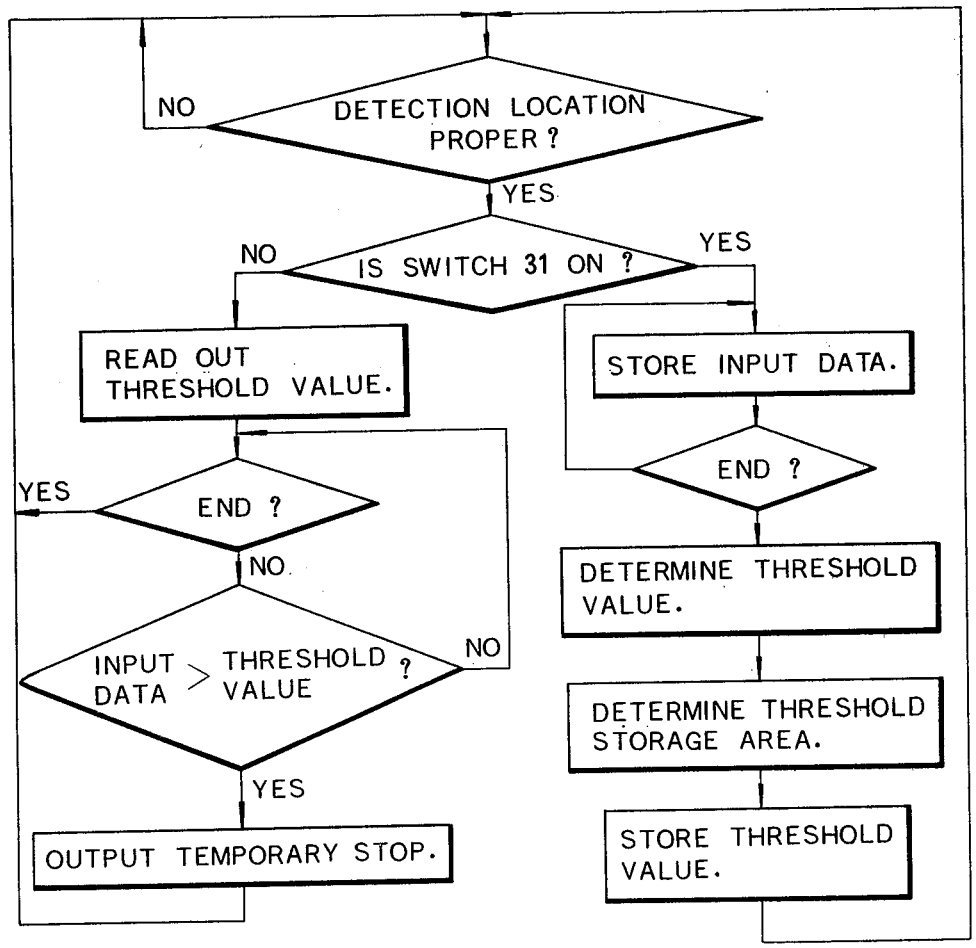
FIG. 10 is a flowchart showing the steps in the abnormality detection according to the embodiment in FIG. 9.

The abnormality detecting operation and the threshold value setting operation will be described with reference to a flowchart shown in FIG. 10.

First, judgement is made based on the NC data NI fed from the NC machine tool 2 whether or not the data concerns an abnormality detecting location. The abnormality detecting location here means a process involving the possibility of occurrence of tool abnormality, and an NC data NI of this process contains the data for selecting a threshold value. That is, judgement is made whether or not the process is a process in which tool abnormalities are to be detected.

Subsequently, judgement on whether or not the threshold value setting switch 31 is ON is made. If the switch 31 is judged OFF, the abnormality detecting operation is performed. First, a corresponding threshold value storage location is selected based on each NC data fed from the NC machine tool 2 (a threshold value memory area is provided corresponding to each NC data and the threshold value is stored in this memory area), and the threshold value T is read out from this memory area. This threshold value T is compared with the input data D fed from the NC machine tool 2, and judgement is made whether or not the condition $D>T$ is established. If the condition $D>T$ is established, the tool is judged abnormal, and a temporary stop signal S is sent out to the NC machine tool 2. If the condition $D>T$ is not established, the judgement is repeatedly made until that abnormality detecting location ends. As the abnormality detecting location ends, the abnormality detecting operation in this abnormality detecting location ends.

When the threshold value setting switch 31 is judged ON as a result of judgement made to determine whether or not said switch 31 is ON, the threshold setting operation according to the method of the invention is performed.

For the threshold value setting, first input data fed from the machine tool 2 are sequentially loaded into a specified memory (not shown), and this input data loading operation is continued until the end or change of the NC data. Accordingly, input data during the period from the turn-on of the threshold value setting switch 31 to the end or change of the NC data are loaded in the memory.

When the loading of input data into the memory ends upon the end or change of the NC data, a threshold value is determined based on the input data loaded into this memory. This determination of a threshold value is, for example, performed based on the maximum or the average value of the input data loaded in the memory. That is, the maximum or the average value of the input data loaded into the memory is first found, and a value 10 to 30% larger than this maximum value, a value a certain percent larger than the average value, a value a given amount larger than the maximum value, a value a given amount larger than the average value or the like is determined as the threshold value. The manner in which this threshold value is calculated is set in advance. Known methods may be used for finding the maximum or the average value.

As the threshold value is determined, a threshold value memory area is determined corresponding to the NC data NI already fed, the threshold value is stored in this memory area, and the threshold value setting operation ends.

Figure 11:
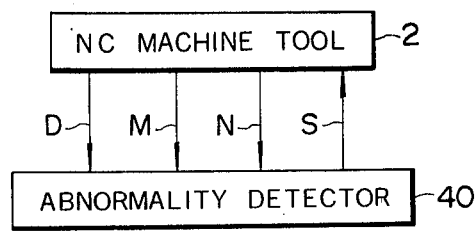
FIG. 11 is a block diagram of a tool abnormality detector of still another embodiment of the invention.

Referring to FIG. 11, the abnormality detector 40 receives from the NC machine tool 2 input data D for the abnormality detection (data varying according to the tool conditions, such as spindle currents and feed currents), M data for discriminating whether or not the abnormality detection is performed, and N data for selecting a threshold value, and sends out a temporary stop signal S to the NC machine tool 2 upon detection of an abnormality in the tool (not shown). Said M data is a data newly introduced for this embodiment, and said N data is a data already set for the numerical control (for example, it corresponds to the sequence number).

Figure 12:
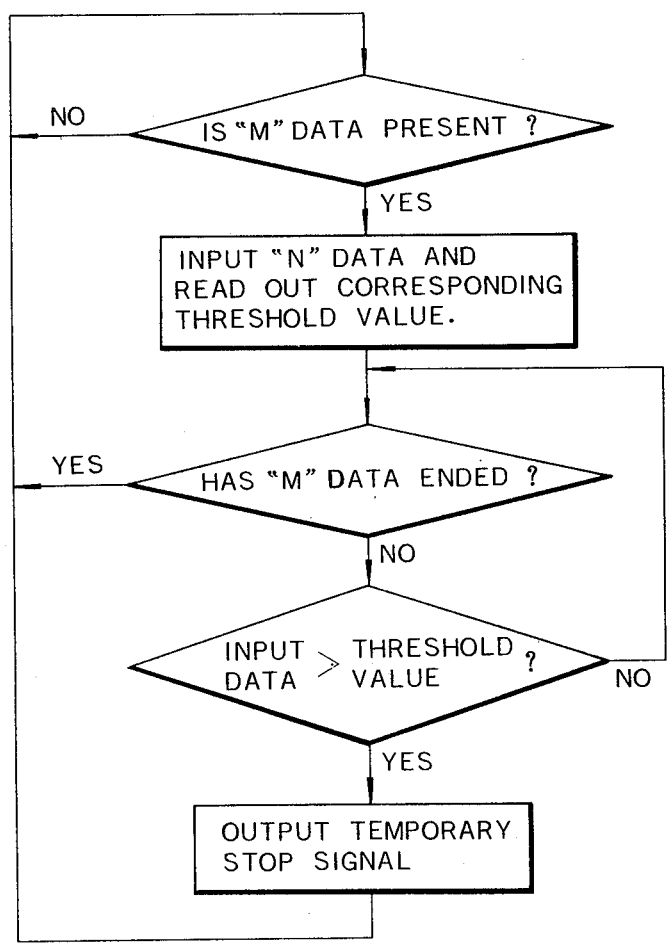
FIG. 12 is a flowchart showing the steps in the abnormality detection according to the embodiment in FIG. 11.

The operation of the device shown in FIG. 11 will be described in detail with reference to the flowchart shown in FIG. 12.

First, judgement is made on whether or not M data is present. Said M data is inserted for a sequence not requiring the tool abnormality detection, such as the sequence for performing tool positioning in the rapid feed and the sequence for the tool replacement (change). If there is no M data, no abnormality detection control is performed since it is not required. If an M data is judged present, an N data is fed, and a threshold value T corresponding to said N data is read out. It is here assumed that a plurality of threshold values are stored in the memory (not shown) corresponding to the N data.

The threshold value T read out corresponding to the N data is compared with an input data D fed from the NC machine tool 2, and judgement is made on whether the condition D>T is established. If the condition D>T is judged established, a temporary stop signal S is output to the NC machine tool 2 since it means that the tool is abnormal. If the condition D>T is not established, judgement is again made whether the condition D>T is established, and this operation is repeated until the end of M data.

Figure 13:
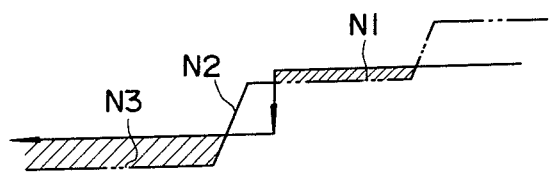
FIG. 13 shows a chain line along which the tip of a tool moves.

For example, when the tip of a tool (not shown) is moved along a chain line shown in FIG. 13, and cutting is performed in the sequences N1 and N3, an M data is inserted relative to the sequences N1 and N3, and no M data is inserted relative to the sequence N2. In this case, a threshold value T1 corresponding to the sequence N1 is set in the sequence I, no threshold value is set in the sequence N2, and a threshold value T3 corresponding to the sequence III is set in the sequence N3.

Hence the selection of multiple threshold values is made possible by the simple addition of M data.

Figure 14:
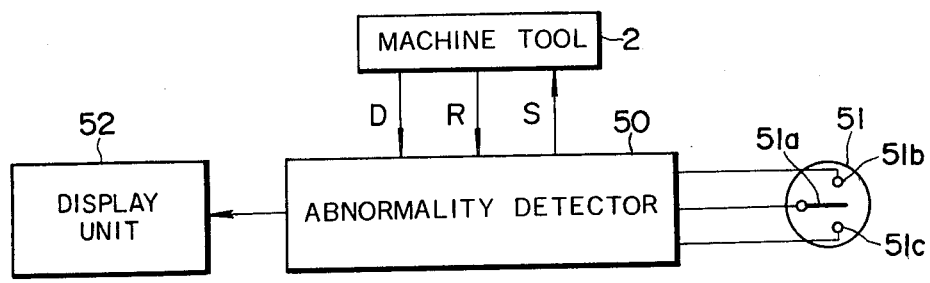
FIG. 14 is a block diagram of a tool abnormality detector of a further embodiment of the invention.
Figure 15:
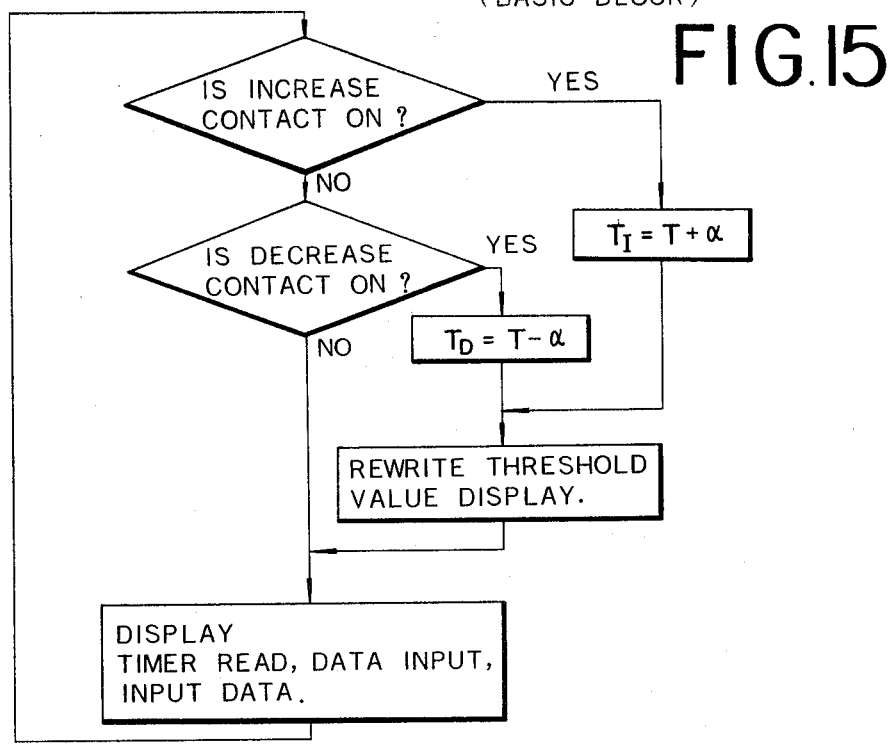
FIGS. 15 and 16 are flowcharts showing the steps in the abnormality detection according to the embodiment in FIG. 14.
Figures 16, 17:
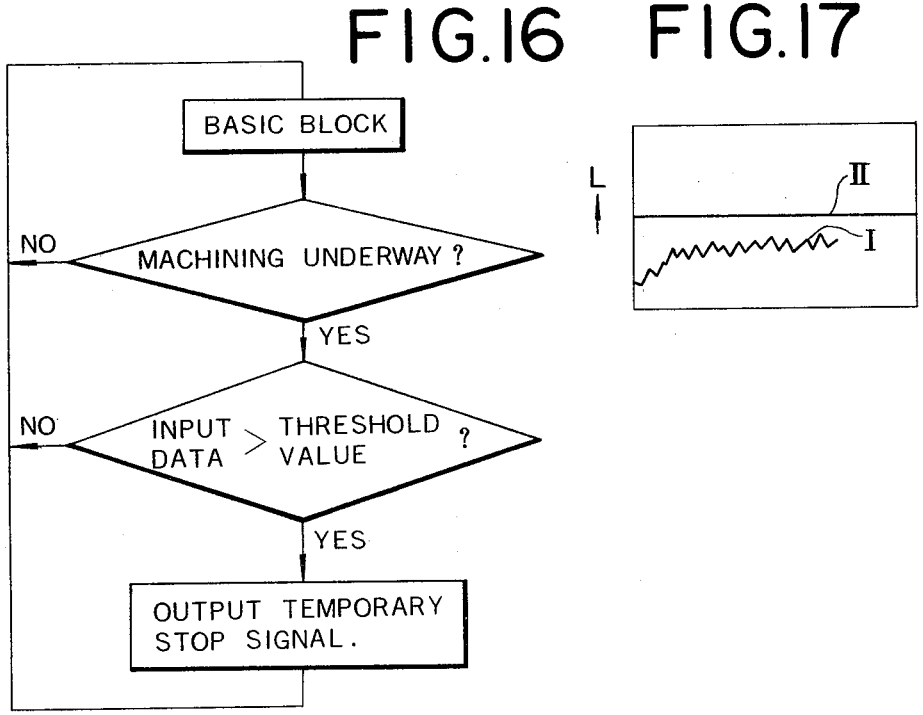
FIG. 17 shows transition of input data I and threshold value II.

Referring to FIGS. 14 through 16 the operation of the device shown in FIG. 14 will now be described with reference to the basic block flowchart in FIG. 15 and the main flowchart in FIG. 16. In FIG. 14, similar to the device shown in FIG. 1, the abnormality detector 50 receives input data D varying according to the conditions of the tool (not shown) and a machining data R for discriminating whether or not machining is being performed from the machine tool 2. The abnormality detector 50 is connected with an external switch 51 for changing the threshold value and a display unit 52 for simultaneously displaying the input data and the threshold value. The external switch 51 has a movable contact piece 51a and two fixed contacts 51b and 51c. When the fixed contact 51b is selected by the movable contact piece 51a, a command is given to increase the threshold value, while when the contact 51c is selected, a command is given to decrease the threshold value. When neither the stationary contact 51b nor 51c i selected by the movable contact 51a, no command for changing the threshold value is generated.

Now, when the external switchs 51 has been transferred either to the stationary contact (increase contact) 51a or the stationary contact (decrease contact) 51b, as shown in the basic block flowchart of FIG. 15, first judgement on whether or not the increase contact 51b is ON is made. If the increase contact 51a is ON, an operation to add a change unit value to the threshold value T $$TI = T + \alpha$$

is executed, and the threshold value T is rewritten so as to correspond to the calculated value TI. The threshold value thus rewritten is fed to the display unit 52, and the threshold value display is changed from the value T to the value TI.

In the display unit 52, the time to be fed from the timer (not shown) is shown in abscissa and the level is shown in ordinate, the past input data outputted from the machine tool 2 are sequentially displayed, and the threshold value is displayed in the form of a single horizontal line. FIG. 17 shows an example of display made by this display unit 52. In FIG. 17, display I indicates a transition of an input data and display II a threshold value. The display II indicating a threshold value is shifted to the arrow marked L direction by the amount of change unit value as the increase contact 51b of the external switch 51 is turned ON. Such display unit may be constructed using, for example, a CRT display.

When the decrease contact 51c of the external switch 51 is turned ON, judgement "IS DECREASE CONTACT ON?" is made, and an operation to subtract a change unit value from the threshold value T $$TD = T - \alpha$$

is executed. The threshold value T is rewritten so as to correspond to this calculated value TD, and the display II (FIG. 17) indicating the threshold value is changed to TD. That is, when the decrease contact 51c of the external switch 51 is turned ON, the display of the display unit 52 indicating the threshold value is shifted to the direction opposite to the arrow marked L direction by the amount of a change unit value $\alpha$.

In this way, each time the external switch 51 is transferred to the increase contact 51b or the decrease contact 51c, the threshold value is increased or decreased by the amount of a change unit value $\alpha$. For example, if the external switch 51 is transferred to the increase contact 51b three times, the threshold value may be increased by the amount of $3\alpha$.

Since the display unit 52 displays an input data and a threshold value simultaneously, the relationship between the input data and the current threshold value can be clearly grasped, thereby allowing re-setting of a proper threshold value.

The basic block flow for changing the threshold value is executed independent of the abnormality detection preceding the flow shown in FIG. 2, as shown in FIG. 16. That is, whether or not machining is underway is judged subsequent to the basic block flow for changing the threshold value, then judgement on whether or not the input data is greater than the threshold value is made, and a temporary stop signal S is sent out to the machine tool 2 is machining is underway and the condition that input data threshold value is established.

Though it is arranged in the above embodiment so as to change the threshold value by a change unit value in steps through the external switch 51, alternative arrangement may be made so as to change the threshold value steplessly through a stepless variable resistor or other means. In this case, arrangement should be made so as to change the threshold value to a value set by a stepless variable resistor with a specially provided threshold value set switch turned on, and to change the display of the threshold value in the display unit according to the change in the threshold value. Changing a threshold value can be made during machining as well as non-machining period.

Figure 18:
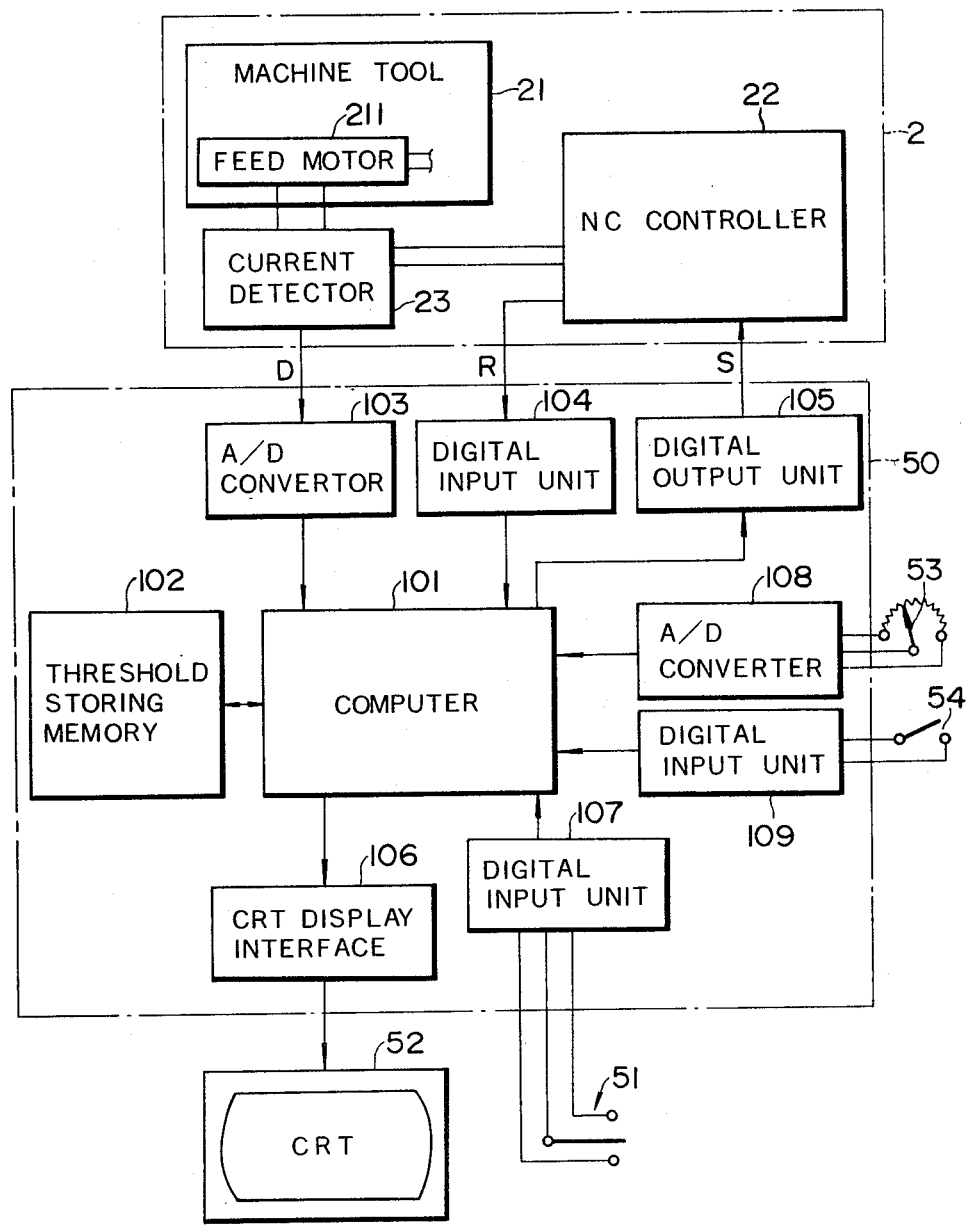
FIG. 18 is a detailed block diagram of the embodiment in FIG. 14.

Referring to FIG. 18, the device shown in FIG. 18 is provided with a volume 53 for steplessly changing the threshold value in addition to an external switch 51 for changing the threshold value in steps and a threshold value set switch 54. A CRT display may be used as a display unit 52. In FIG. 18, for convenience sake, the same numbers are assigned to the parts performing the function similar to those of the device shown in FIG. 8. The machine tool 2 comprises a machine tool section 21, a numerical control controller 22, and a current detector 23 which detects a feed current of the feed motor 211 in the machine tool section 21. The current detector 23 outputs a signal indicating a detected current value (input data D) and the numerical control controller 22 outputs a machining data R indicating the machining status or non-machining status. These outputs are applied to the abnormality detector 50.

The abnormality detector 50 comprises a computer 101 a threshold value storage memory 102, an analog-digital converter 103 for feeding signals indicating input data D applied from a current detector 23 after analog-to-digital conversion, a digital input device 104 for feeding a machining data R applied from a numerical control controller 22 to the computer 101, a digital output device 105 for feeding a temporary stop signal S generated from the computer 101 to the numerical control controller 22, an analog-digital converter 108 for feeding a threshold value set via a volume 53 to the computer 101 after analog-to-digital conversion, a digital input device 109 for feeding the output of a threshold value set switch 54 to the computer 101, a digital input device 107 for feeding the output of an external switch 51 to the computer 101, and a CRT graphic display interface 106 for feeding display data outputted from the computer 101 to a CRT display unit 52.

In such system configuration, when the threshold value set switch 54 is turned ON after a proper threshold value is set by the volume 53, the output of the volume 53 is fed to the computer 101 through the analog-digital converter 108, and the threshold value is loaded into the threshold value storage memory 102. The external switch 51 is capable of being operated independent of the volume 53. Signals outputted from the external switch 51 by the operation thereof are fed to the computer 101 through the digital input device 107 with the resultant increase or decrease of the threshold value by a specified unit value ($\alpha$).

The computer 101 compares the threshold value stored in the memory 102 and the detected current value, and sends out a temporary stop signal S to the numerical control controller 22 through the digital output device 105 upon establishment of the condition threshold value < input data D.

The computer 101 feeds the data indicating the threshold value stored in the memory 102 to the CRT display unit 52 through the CRT graphic display interface 106, the display unit 52 displays the threshold value in a single horizontal line as shown in the display II of FIG. 17, the threshold value storage memory 102 sequentially stores input data D fed through the analog-digital converter, said stored value is fed to the CRT display unit 52 through the CRT graphic display interface 106, and past input data D are consecutively displayed as shown in the display I in FIG. 17.

Accordingly, the operator should watch the display unit 52 for any variation of threshold value and input data D displayed therein, detect the extent of tool abnormality, increase the threshold value by operating the external switch if he judges that the tool may continue to be used for machining, and decrease the threshold value by operating the external switch 51 when he wants to stop the machine due to a smaller abnormality. The case where the input data D increased upon the occurrence of an abnormality has been described above. In the case where the input data D decreases upon the occurrence of an abnormality, the above operation is reversed.

When a tool is judged normal due to a high threshold value even if the tool is empirically known to be in trouble as indicated by serious chatter or other symptoms, the threshold value should be decreased to a low value so as to enable to judge a chatter of the same degree as an abnormality.

I claim:

1. A device for detecting tool abnormalities in machine tools as machining is in process whether machine tool data values are determined from and are a function of the operating conditions of the machine tool, and wherein a tool abnormality is detected by comparing said machine tool data values to a theshold data value, comprising:
   (a) a machine tool control unit for outputting a machining-in-process signal as machining is in process, for determining and outputting machine tool data values and for terminating machining in response to receipt of a stop-machining signal;
   (b) a threshold setting switch; and
   (c) an abnormality detection unit connected to the machine tool control unit and the threshold setting switch for determining and automatically setting the threshold data value according to machine tool data values received from the machine tool control unit when the threshold setting switch is on, for comparing machine tool data values received from the machine tool control unit when the abnormality detector unit receives a machining-in-process signal from the machine tool control unit when the threshold setting switch is off to the set threshold data value, and for outputting a stop-machining signal to the machine tool control unit if a comparision indicates a machine tool abnormality.

2. In a method for detecting tool abnormalities in numerically controlled machine tools wherein machine tool data values are determined from and are a function of the operating conditions of the machine tool, and involving the comparing of said machine tool data values to a threshold data value selected from a plurality of threshold data values according to numerical control data prior to making the comparisons, comprising the steps of:

(a) sequentially storing in a memory means a plurality of said threshold data values which correspond to different positions along the machining path determined according to said numerical control data;

(b) determining, at different positions along the machining path specified by said numerical control data, the actual machine tool data values; and (c) controlling the machine tool in response to a comparison of the determined machine tool data value and the threshold data value stored in the memory means for the position, selected according to the numerical control data, at which the corresponding actual machine tool data is determined.

3. A device for detecting tool abnormalities in numerically controlled machine tools wherein machine tool data values are determined from and are a function of the operating conditions of the machine tool, and wherein a tool abnormality is detected by comparing said machine tool data values to a threshold data value selected from a plurality of threshold data values, comprising:

(a) a machine tool control unit for outputting numerical control data, for determining and outputting machine tool data values and for terminating machining in response to receipt of a stop-machining signal;

(b) a threshold setting switch; and (c) an abnormality detection unit connected to the machine tool control unit and the threshold setting switch for (i) performing a first operation if the switch is determined to be on, said first operation including determining and automatically setting a threshold data value according to machine tool data values received from the machine tool control unit under the control of the numerical control data, and (ii) performing a second operation if the switch is determined to be on, said second operation including selecting a set threshold data value and comparing said threshold data value to machine tool data values received from the machine tool control unit according to the numerical control data and outputting a stop-machining signal to the machine tool control unit if a comparison indicates a machine tool abnormality.

4. In a method for detecting tool abnormalities in numerically controlled machine tools wherein machine tool data values are determined from and correspond to ones of a sequence of operations of the machine tool, and involving the comparing of said machine tool data values to a threshold data value, a method for determining whether to perform any comparisons and for selecting the threshold data value from a plurality of threshold data values stored in a memory means, comprising the steps of:

reading the threshold data value which corresponds to the operation presently being performed by said machine tool, and which has been stored in the memory means at a location selected according to a first numerical control data indentifying said operation within said sequence of operations only if a second numerical control data indicates that a comparison is to be carried out during the corresponding presently performed operation; and controlling the machine tool as a function of said comparison.

5. A device for detecting tool abnormalities in numerically controlled machine tools wherein machine tool data values are determined from and are a function of the operating conditions of the machine tool, and wherein a tool abnormality is detected by comparing said machine tool data values to a threshold data value selected from a plurality of threshold data values, comprising:

(a) a machine tool control unit for outputting first numerical control data and second numerical control data, for determining and outputting machine tool data values, and for terminating machining in response to receipt of a stop-machining signal;

(b) a threshold setting switch; and (c) an abnormality detection unit connected to the machine tool control unit and the threshold setting switch for (i) performing no operations if no first numerical control data is received from the machine tool control unit, (ii) performing a first operation if first numerical control data is received from the machine tool control unit simultaneous with the switch being on, said first operation including the determining and automatically setting a threshold device value according to machine tool data values received from the machine tool control unit under the control of the second numerical control data, and (iii) performing a second operation if the first numerical control data is received from the machine tool control unit simultaneous with the switch being off, said second operation including the selecting of a set threshold data value and comparing said threshold data value to machine tool data values received from the machine tool control unit according to the first numerical control data and outputting a stop-machining signal to the machine tool control unit if a comparison indicates a machine tool abnormality.

6. The device according to claim 1 wherein the machine tool data values are the armature current values of a motor.

7. The device according to claim 1 wherein said abnormality detection unit determines the threshold data values by utilizing:

(a) means for determining the maximum machine tool data value stored in the memory means; and (b) means for increasing said maximum value by a predetermined percentage thereof.

8. The device according to claim 1 wherein said abnormality detection unit determines the threshold data values by utilizing:

(a) means for determining the minimum machine tool data value stored in the memory means; and (b) means for decreasing said minimum value of a predetermined percentage thereof.

9. The device according to claim 1 wherein said abnormality detection unit determines the threshold data values by utilizing:

(a) means for determining the mean machine tool data value stored in the memory means; and (b) means for modifying said mean value by a predetermined percentage thereof.

10. The device according to claim 1 wherein the abnormality detection unit includes a memory means for sequentially storing machine tool data values received from the machine tool control unit when the threshold setting switch is on and for storing the threshold data value.

11. The device according to claim 3 wherein the abnormality detection unit includes memory means for sequentially storing machine tool data values received from the machine tool unit during a first operation and storing the one or more threshold data values determined and set during a first operation.

12. The device according to claim 1 further comprising a variable analog output means connected to the abnormality detector for steplessly changing the set threshold data value as the threshold setting switch is on.

13. The device according to claim 12 wherein the variable analog output means is a volume.

14. The device according to claim 1 further comprising a digital output means connected to the abnormality detector for modifying stepping the set threshold data value in a stepwise fashion when the threshold setting switch is on.

15. The device according to claim 14 wherein the digital output means is a switch comprising:
  (a) a movable contact piece;
  (b) a first fixed contact piece for increasing the set threshold data value by a predetermined unit each time the movable contact piece is placed in contact with it; and
  (c) a second fixed contact piece for decreasing the set threshold data value by a predetermined unit each time the movable contact piece is placed in contact with it.

16. The device according to claim 1 further comprising a display unit connected to the abnormality detection unit for displaying the machine tool data values and the threshold data values used for the comparisons.

17. The device according to claim 16, wherein the display unit simultaneously displays the machine tool data value and threshold data value used in the current comparison and the history of machine tool data values and threshold data values used in prior comparisons.

18. The device according to claim 16 wherein the display unit graphically displays the machine tool data values and threshold data values.

19. A method for detecting tool abnormalities in a numerically controlled machine tool of the type which performs a sequence of operations to carry out a machining procedure, and in which tool abnormality detection is carried out only during certain of said operations, comprising:
  providing a data set specifying during which operations in said sequence tool abnormality detection is to be carried out,
  storing a set of tool abnormality threshold parameters for utilization during respective ones of said operations, and
  detecting, during performance of an operation in said sequence for which said data set specifies that tool abnormality detection is to be carried out, the actual tool performance values and comparing these with the stored abnormality threshold parameters for the respective operation; and
  controlling the operation of said machine tool in response to such comparison.

* * * * *